Dec. 21, 1965 S. R. KRAUSE ET AL 3,225,265

REMOTE CONTROL ELECTRICAL SWITCH AND RADIO FREQUENCY ACTUATING SYSTEM THEREFOR

Filed Sept. 8, 1961 3 Sheets-Sheet 1

INVENTORS
S. R. Krause &
H. L. Miller

BY
Wilkinson, Mawhinney & Theibault
ATTORNEYS

INVENTORS
S. R. Krause &
H. L. Miller
BY
Wilkinson, Mawhinney & Theibault
ATTORNEYS Dec. 21, 1965 | S. R. KRAUSE ET AL | 3,225,265

REMOTE CONTROL ELECTRICAL SWITCH AND RADIO FREQUENCY ACTUATING SYSTEM THEREFOR

Filed Sept. 8, 1961 | 3 Sheets-Sheet 3

INVENTORS
S. R. Krause &
H. L. Miller

BY *Wilkinson, Mawhinney & Theibault*
ATTORNEYS

United States Patent Office 3,225,265
Patented Dec. 21, 1965

3,225,265
REMOTE CONTROL ELECTRICAL SWITCH AND RADIO FREQUENCY ACTUATING SYSTEM THEREFOR

Stephen Robert Krause, Pikesville, and Harvey Leonard Miller, Baltimore, Md., assignors to K & M Electronics Company, a corporation of Maryland Filed Sept. 8, 1961, Ser. No. 136,946
3 Claims. (Cl. 317—138)

The present invention relates to remote control electrical switch and radio frequency actuating system therefor, and has for an object to provide an apparatus and system for remotely controlling switches in series with electrical devices wherein one or all of a plurality of devices are desired to be actuated from a remote station.

An object of the present invention is to provide components in this system which readily lend themselves for adaptation to existing equipment not necessitating a replacement of all presently existing switches to be employed for actuating electrical devices, but which lends itself to application on existing switches with a minimum of parts and labor.

Another object of the present invention is to provide a system and apparatus in which the apparatus may be actuated by a radio frequency transmitting and receiving system in which the receivers are plural and each is tuned to a predetermined frequency and in which the transmitter is provided with means for coding pulses for preselecting any one or group of a plurality of different receivers.

A further object of the present invention is to provide a radio frequency actuated relay, which relay by-passes the conventional on-off switch on any electrical device which it is desired to actuate.

A still further object of the present invention is to provide a system and apparatus which is capable of controlling, for example, electrical lighting systems where the individual electric lamps can be selectively controlled from a remote station or the receiver for actuating the relay of the system may be replaced by a photoelectric cell device for controlling the resistance in an electrical lighting circuit whereby the light level in a given area may be maintained at a constant base irrespective of light or darkness from without resulting in an optimum use of electrical power at a minimum of cost.

With the foregoing and other objects in view, the invention will be more fully described hereinafter, and will be more particularly pointed out in the claims appended hereto.

In the drawings, wherein like symbols refer to like or corresponding parts throughout the several views.

Figures 5, 5A:
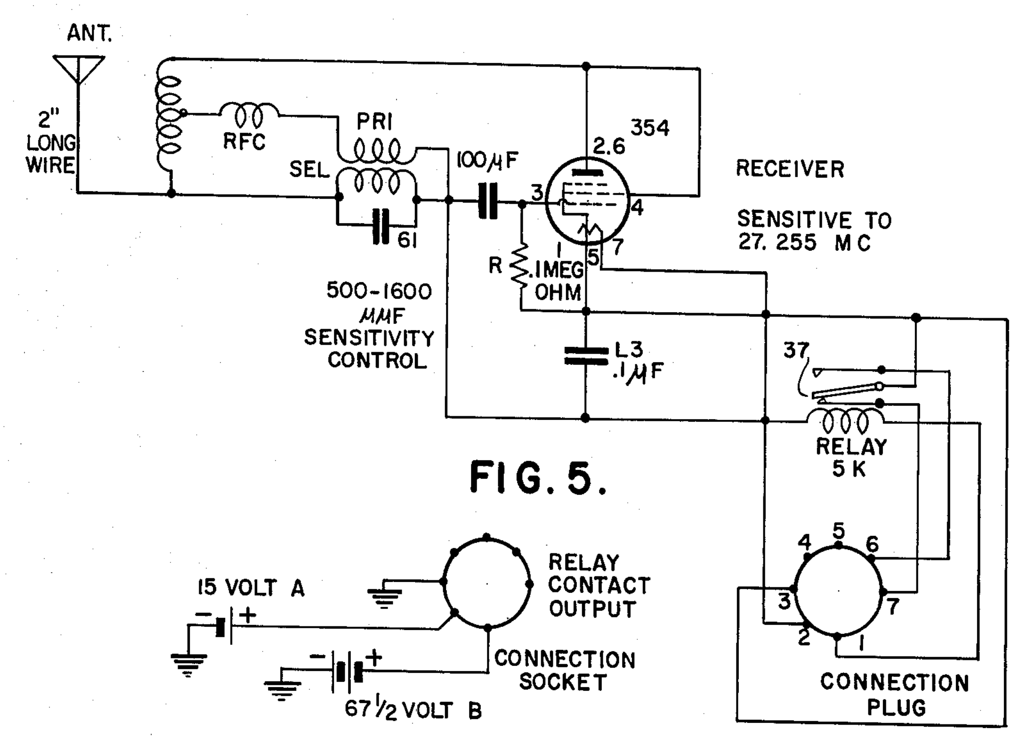
FIGURE 5 is a schematic of a radio frequency receiver which may be employed for actuating the control relay of the present invention.

FIGURE 5*a* is a schematic of the relay socket employed with the receiver of FIGURE 5.

Figure 6:
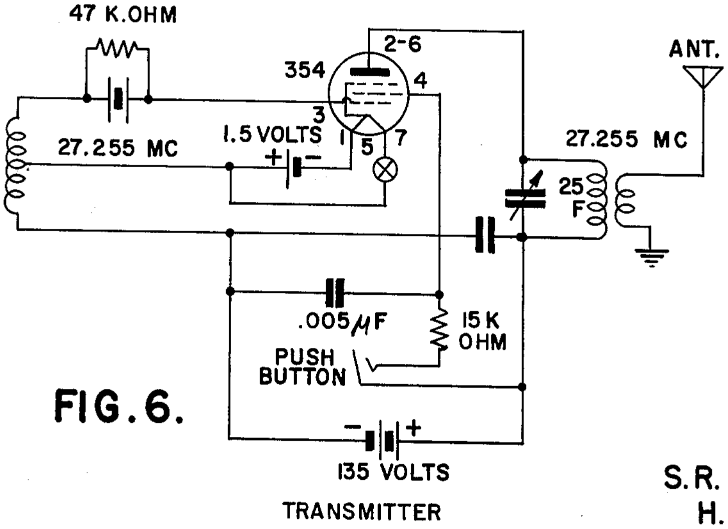

FIGURE 6 is a schematic of one form of portable remote radio frequency transmitter which may be employed with the present invention.

Figure 7:
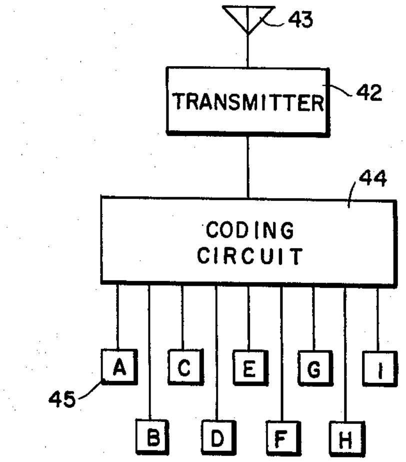

FIGURE 7 is a block diagram showing the coding circuit in series with the transmitter for selecting predetermined ones of a plurality of receiving units.

Figure 8:
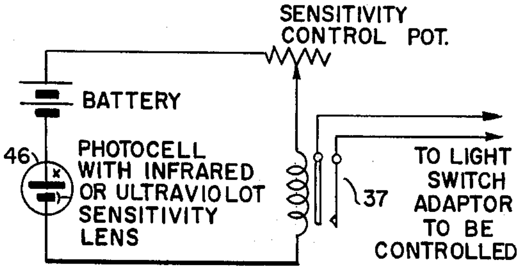

FIGURE 8 is a schematic of a photoelectric circuit which may be employed for actuating the control relay of the present invention.

Figure 9:
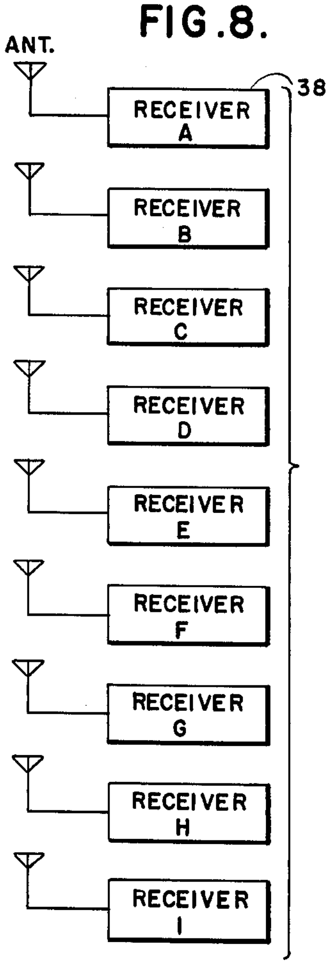

FIGURE 9 is a block diagram of a plurality of remotely located receivers which receive coded pulses from the coding circuit of FIGURE 7.

Figure 10:
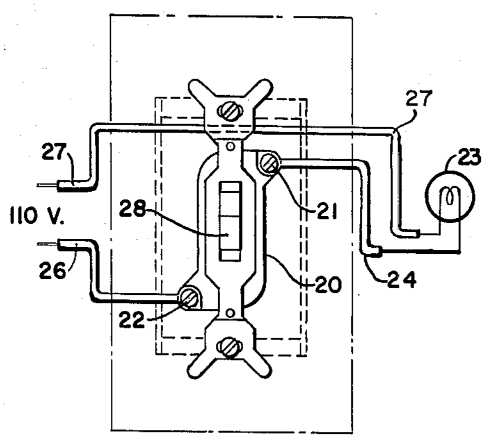

FIGURE 10 is a front elevational view of an electrical control switch to be actuated by the present invention.

Figure 11:
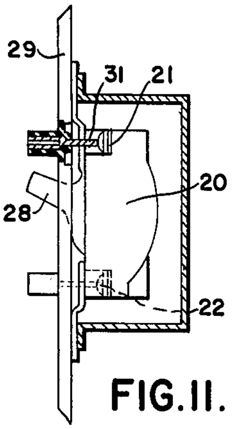

FIGURE 11 is a vertical section taken through the electrical control switch for the device to be controlled having the modified cover plate of the present invention installed thereon.

The system and apparatus of the present invention will be explained by way of application to electrical lighting in a conventional home, but it is understood that this is not limitative of the invention since other electrical apparatuses may be remotely controlled applying the teaching of the present invention other than electric lamps; such devices as household appliances, television sets, toasters, coffee makers, radios, air conditioning, heating, etc.

The wall actuating switch of a house lighting system is designated at 20 and is provided with bare exposed terminals 21 and 22. Connected in circuit with the terminals 21, 22 of switch 20 is an electric lamp 23 receiving its energy through lines 24 and 27. A source of electrical potential in the instant application being at a voltage of 110 is placed across the leads 26, 27. The toggle actuating member 28 of the switch 20 is turned to the "off" position.

Figures 1, 2, 3:
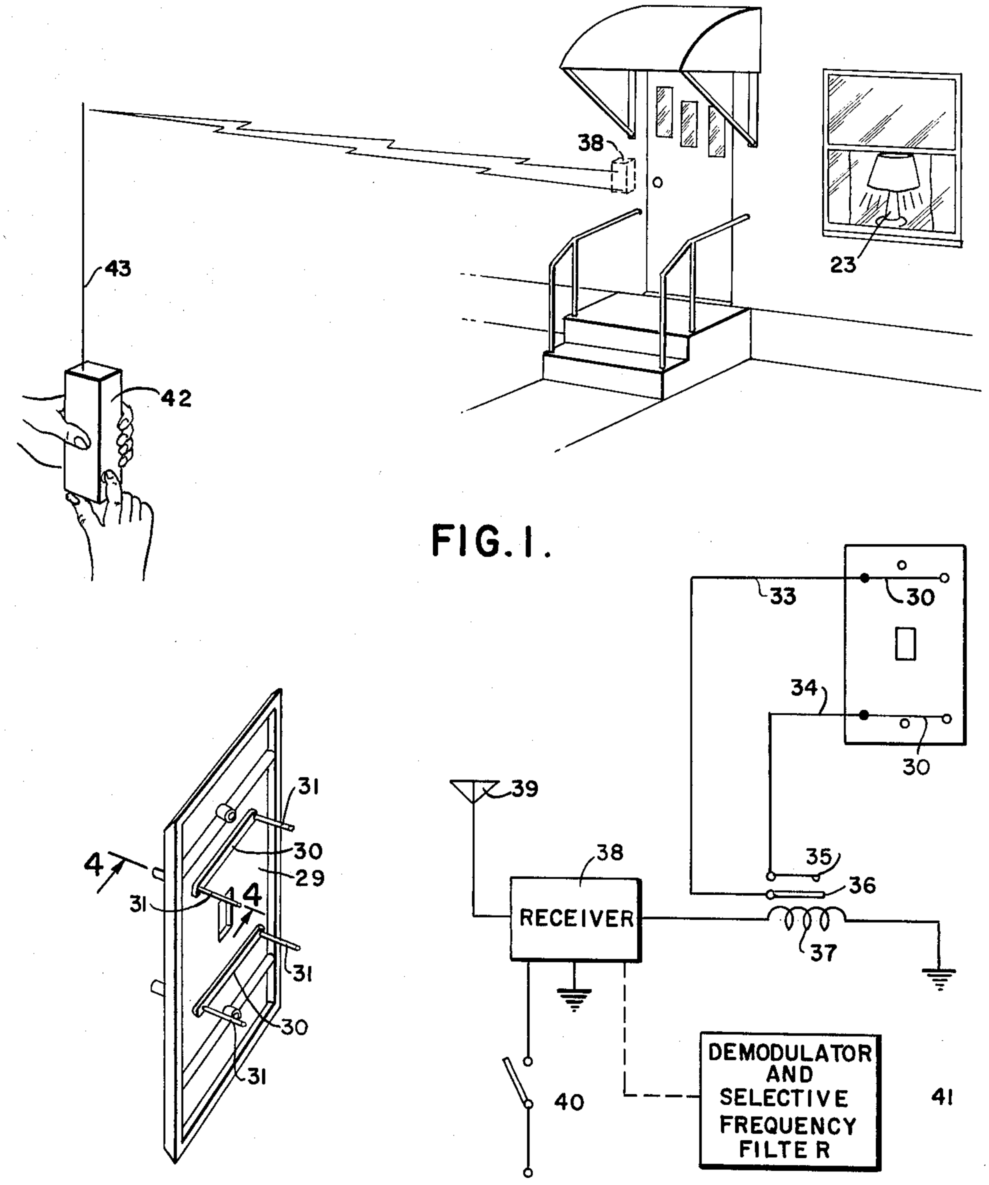
FIGURE 1 is a schematic perspective view of an electrical lamp controlled from a wall switch, the switch being under the control of a remote radio transmitter in the hands of the user.
FIGURE 2 is a schematic of the radio frequency receiver and cover plate to be employed with the apparatus of the present invention.
FIGURE 3 is a rear perspective view of one form of cover plate which may be employed with the present invention.
Figure 4:
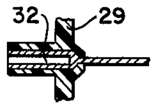
FIGURE 4 is a fragmentary cross-sectional view through a cover plate showing the jack and bar terminal contact members to be employed with the cover plate and switch.

Referring now to FIGURES 3 and 11, a cover plate 29 is provided having bus bars 30 on its inside cover portion, which bus bars have connected thereto electrical pins 31. The pins 31 frictionally engage the bar terminals 21, 22 of the switch. On the other side of the pins 31 are jacks 32 into which prongs of the attaching device of the receiving and relay actuating unit may be inserted. These jacks perform a dual function in that they not only electrically couple the relay actuating means to the wall switch but also may act as a mechanical support therefor.

Referring now to FIGURE 2, it will be noted that the bus bars 30 are connected to two leads 33 and 34 of the contact points 35, 36 of a relay 37. The coil of the relay is provided for opening and closing contacts 35, 36 and therefore bypassing the switch 20 and placing the electrical potential across the lamps 23 when actuated by a radio frequency receiver shown in block diagram at 38. The receiver 38 has a receiving antenna 39 and a control switch 40 as well as a selective frequency filter 41.

In order to illustrate an operative device and not to be limited to the specific embodiment illustrated, FIGURES 5, 5*a* and 6 illustrate schematically operative transmitters and receivers which may be employed with the present invention. However, it is to be understood that this invention is not limited to this specific form of transmitter or receiver since any transmitter capable of transmitting a predetermined radio frequency, and any receiver capable of receiving the transmitted radio frequency signal from said transmitter may be employed. In reality FIGURES 5 and 6 disclose a known type of transmitter and receiver for effecting the operation herein outlined. The receiver of FIG. 5, shown at 38 in FIG. 1, is contained in an enclosure for mounting on a wall or the like. The enclosure may also contain the battery supply circuitry of FIG. 5*a* with its labeled CONNECTION SOCKET receiving the labeled CONNECTION PLUG of FIG. 5. As the receiver may be quite light, it may be supported along with the relay through the mechanical plug in connection to cover plate 29. Alternatively, of course, it may be mounted adjacent to plate 29 in electrical connection therewith as depicted herein.

Referring now to FIGURES 7 and 9, a portable remote transmitter 42 having a transmitting antenna 43 may be keyed from a coding circuit 44 having keying means 45 for pulsing certain predetermined frequencies. The receiver 38 which is employed and fits over the switch plate 29 is shown in FIGURE 9 as being a plurality of receivers, for example as many as twenty or more remote control switches may be employed in a singled dwelling house and each receiver bearing a letter is a separate and distinct switch, and it will be noted that each receiver bearing a letter corresponds to a similarly lettered key on the coding circuit control means 45.

While, as illustrated it is assumed that each keying circuit and its correspondingly lettered receiver would be for a different frequency band, it will also be appreciated that any gang groups of switches may be simultaneously or substantially simultaneously operated by tuning the receiver for those switches to the same frequency as any preselected coding means. Also the transmitter could be so keyed that by depressing one button, this would simultaneously activate two or three defferent frequencies within the transmitter which would in turn activate the receivers which were tuned to these particular frequencies.

Referring now to FIGURE 8, which is a modified form of relay actuating device which may replace the transmitter and receiver of FIGURES 5 and 6, any suitable light source replacing the transmitter of FIGURE 6, and the unit of FIGURE 8, replacing the unit of FIGURES 5 and *5a*, the relay 37 may be actuated by a photoelectric means 46 between the cells of which is either an ultra-violet or infrared ray, breaking the radiant energy beam causing actuation of the relay 37 and hence energization of the electrical device 23.

Referring now to FIGURE 1, the transmitter 42 is shown in the hands of the user who is pulsing the transmitter, which pulsed signal is being received inside the residence by a receiver 38 so that the relay 37 is closed, energizing the wall switch circuit to illuminate lamp 23 so that the carrier of the transmitter may approach the house in an illuminated path. Relay 37 may be of many conventional types. For example, it may comprise an ordinary relay which is maintained operative so long as the transmitter is on, i.e., its operative button is maintained depressed until the operator enters the house and manually operates the electrical switches therein. Alternatively, the relay may be of the well-known latching type operable to its on position by a first signal from the transmitter and to its off position by a second signal from the transmitter.

Although we have disclosed herein the best forms of the invention known to us at this time, we reserve the right to all such modifications and changes as may come within the scope of the following claims.

What we claim is:

1. For use with a normally off electrical switch in an electrical circuit having an electrically actuated device in series therewith and connected to a source of electrical potential, said electrical switch having bare electrical terminals, a remote control device comprising a switch cover plate having bus bars in electrical contact with said bare electrical terminals, terminal jacks in said cover plate in communication with said bus bars, a relay having a coil and contacts, said contacts connected across the terminal jacks, the contacts being biased to a normally open position, radio frequency actuated receiving means connected to actuate said relay coil to close the contacts of said relay to by-pass the normally off electrical switch and energize the electrically actuated device, and a portable remote radio frequency transmitter operable to transmit a radio frequency signal at a frequency receivable by said radio frequency actuated receiving means.

2. A remote control device as claimed in claim 1 wherein said radio frequency actuated receiving means comprises a plurality of receivers, each receiver sensitive to but one frequency, and wherein said portable remote radio frequency transmitter includes frequency selective means whereby selected ones of a plurality of frequencies may be transmitted.

3. A device as claimed in claim 1 wherein said switch cover plate is provided with a plurality of selective openings for receiving the terminal jacks and placing the jacks in electrical communication with wall-type actuating switches irrespective of the location of the bare electrical terminals on said switch.

References Cited by the Examiner

UNITED STATES PATENTS

| | | | |
|---|---|---|---|
| 2,263,298 | 11/1941 | Haimbaugh | 317—138 X |
| 2,914,709 | 11/1959 | Rabinow | 317—130 X |
| 3,011,102 | 11/1961 | Balan | 317—138 X |
| 3,035,251 | 5/1962 | Inderwiesen | 327—138 X |
| 3,086,146 | 4/1963 | Edler | 317—124 |

SAMUEL BERNSTEIN, *Primary Examiner.*

LLOYD McCOLLUM, L. T. HIX, *Examiners.*